Patented Dec. 8, 1931

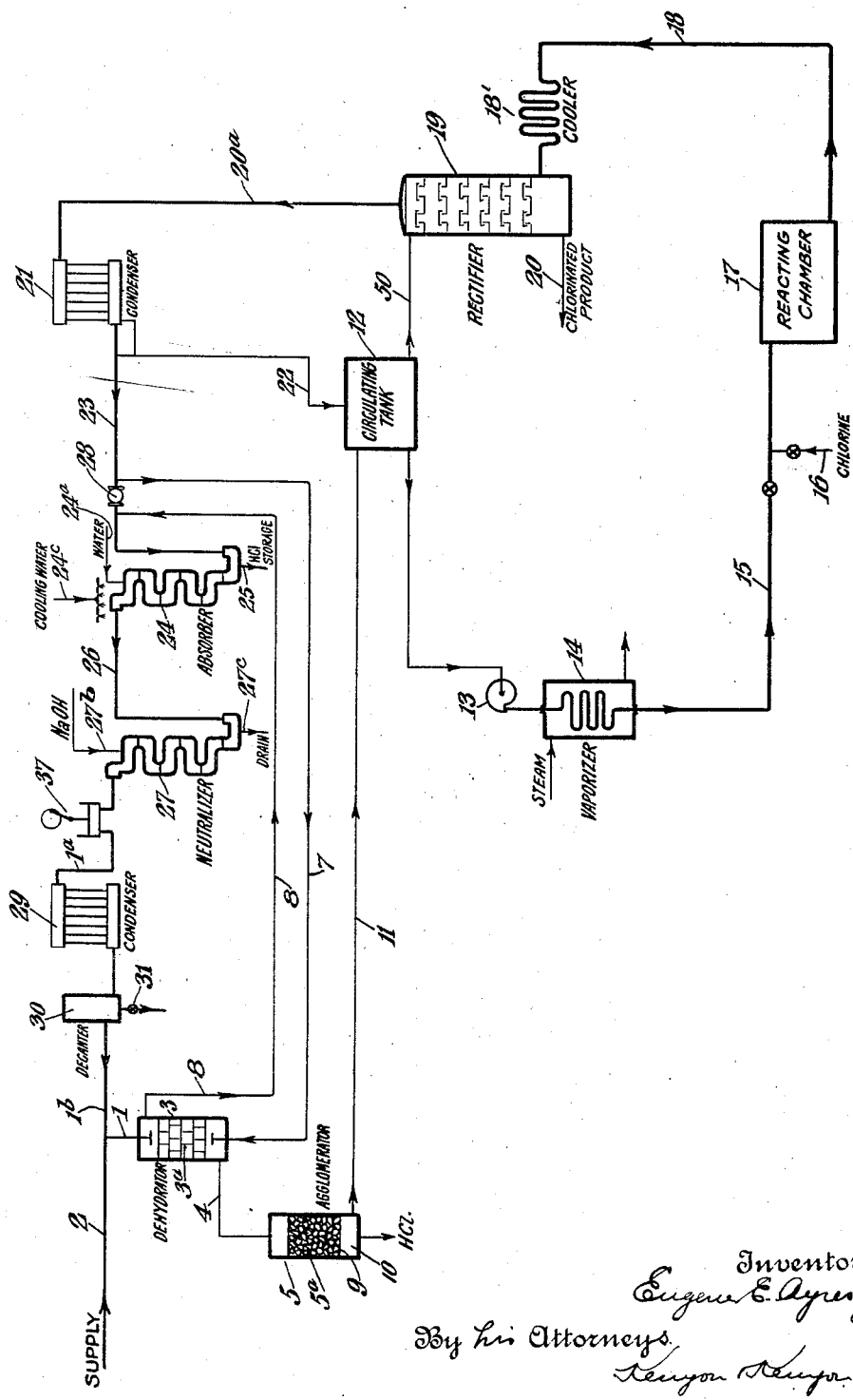

1,835,202

UNITED STATES PATENT OFFICE

EUGENE E. AYRES, JR., OF SWARTHMORE, PENNSYLVANIA, ASSIGNOR TO THE B. A. S. COMPANY, OF PHILADELPHIA, PENNSYLVANIA, A CORPORATION OF DELAWARE

CHLORINATION

Application filed February 4, 1927. Serial No. 165,874.

My invention relates to chlorination and particularly to the chlorination of aliphatic hydrocarbons by substitution with the formation of hydrogen chloride, and my invention includes a dehydrating step particularly applicable in chlorination in accordance with my invention and also generally applicable.

In chlorination of aliphatic hydrocarbons by substitution, hydrogen chloride is produced in the chlorinating reaction, and water in the equipment used in chlorination causes the formation of hydrochloric acid. I have found that it is essential to successful commercial chlorination by substitution, not only to guard against leakage of water into the equipment used in such chlorination but to prevent introduction into the system of substantially all moisture that will not remain in vapor phase at all times in the chlorinating apparatus under the various conditions existing therein. I have found that aliphatic hydrocarbons in liquid form, particularly quantities thereof recovered from products of the chlorination step and from which hydrogen chloride has been removed by absorption with water as well as fresh supplies of such hydrocarbons, contain so much moisture which will not settle out that chlorination thereof by substitution is not commercially practicable because of the practical difficulty of preventing the harmful effects of the relatively large quantity of hydrochloric acid that is produced in and destroys the chlorinating equipment. I have discovered that such chlorination of such hydrocarbons is commercially practicable if all such hydrocarbons, both such quantities as may be recovered from the products of chlorination and fresh supplies to the system, are substantially freed of all moisture that will cause formation of hydrochloric acid under any of the various conditions existing in the chlorinating process. Neither calcium chloride nor solid caustic soda will dehydrate liquid aliphatic hydrocarbons to the extent to which they can be dehydrated in accordance with my invention nor to the extent required for commercially successful chlorination by substitution.

drogen chloride of such hydrocarbons containing water that will not settle out results in precipitation of moisture in the form of aqueous hydrochloric acid, and that when the precipitated moisture is removed the hydrocarbons are so far freed of water that chlorination thereof by substitution is commercially practicable because they contain no moisture that will be precipitated in the chlorinating apparatus; and traces of water are removed that cannot be removed by calcium chloride or solid sodium hydroxide.

Dehydration of aliphatic hydrocarbons in accordance with my invention is also more effective than dehydration thereof by sulphuric acid and other substances that are not soluble in the hydrocarbons because hydrogen chloride dissolves in the hydrocarbons and is therefore certainly brought into effective relation with all moisture therein and it dissolves in the moisture, forming aqueous hydrochloric acid in particles of such magniture that they will settle by gravity. But, sulphuric acid must be brought mechanically into contact with the moisture which is widely disseminated in the hydrocarbon and even the formation of an emulsion of the sulphuric acid and hydrocarbon does not certainly bring that acid into effective relation with the dispersed moisture, and, if it does, the operation is an absorption of the moisture by the acid. Furthermore, sulphuric acid oxidizes and polymerizes the hydrocarbons and leaves objectionable impurities and traces of sulphuric acid and sulphur dioxide therein, and it is, therefore, highly objectionable as an agent for dehydration of substances for general purposes and particularly in preparation for chlorination.

Moreover, the presence of dry hydrogen chloride in a hydrocarbon dehydrated in accordance with my invention is not a disadvantage in chlorination and if a neutral dehydrated oil is desired the hydrogen chloride may be removed by mere distillation in the case of higher boiling oils, and by rectification in the case of lower boiling oils.

The avoidance of difficulties in chlorination, due to the presence of formation of practice of my invention, even though hydrogen chloride is formed in the chlorination, because the substances that contain moisture and are to be introduced into or returned to the chlorination reaction are preliminarily subjected, in acid resisting apparatus, to the same influences that would otherwise, because of that moisture, tend to precipitate aqueous hydrochloric acid at sensitive parts of the equipment. In other words, dehydration of a hydrocarbon by acidulation with hydrogen chloride makes the hydrocarbons dryer than any previously known method of dehydration since previously known methods leave moisture in the hydrocarbons that is precipitated in systems for the chlorination thereof, whereas dehydration by hydrogen chloride acidulation removes moisture to such an extent that precipitation of moisture in the system will not occur by reason of the presence of hydrogen chloride therein.

Dehydration is particularly important if the substance being chlorinated produces with water a constant boiling mixture that is so low in water content that traces of moisture are not carried thru the system in vapor phase but are deposited in liquid phase and absorb hydrogen chloride. For example, pentane forms with water a constant boiling mixture of very low water content while benzol will carry along a greater quantity of moisture because it forms with water a constant boiling mixture of greater water content.

In the practice of my invention the precipitated aqueous hydrochloric acid will completely settle out of the oil by gravity but the settling is much more rapid if the particles are agglomerated, as by passing the oil over or through any substance or apparatus suitable for that purpose.

Hydrogen chloride produced in chlorination may be removed from the other products of the chlorinating reaction by absorption in water, but if unchlorinated hydrocarbons are contained in those products and are so freed of acid, those hydrocarbons are then moisture laden and carry moisture into the equipment if they are returned directly to the chlorinating reaction, and fresh supplies of hydrocarbons are moisture laden. But, chlorination in accordance with my invention ensures that such undesirable moisture will not be introduced into the chlorinating equipment.

In order to assist in the understanding of my invention but without limiting my invention thereto, I will describe my chlorinating process, including dehydration of hydrocarbons, in connection with one form of apparatus suitable to the practice thereof. To that end there is diagrammatically shown in the single figure of the annexed drawing, apparatus whereby chlorination of certain hydrocarbons of the aliphatic series, may be carried out in accordance with my invention, it being specifically understood that modifications and variations in the construction shown may be made for the purpose of applying my invention in connection with the same or other substances without departing from the spirit of my invention.

In the apparatus shown diagrammatically in the drawing hydrocarbons from circulating tank 12 are passed by pump 13 through heater 14. The hydrocarbon vapors produced in heater 14 are passed through pipe 15 to the reacting chamber 17 of the chlorinating operation, the chlorine being introduced into pipe 15 by pipe 16.

The mixture of chlorine and the substance to be chlorinated passes into reacting chamber 17 where the reaction may be effected in any desired manner. The products of the reaction pass through pipe 18 and cooler 18' to a rectifying column 19 in which a reflux is maintained with hydrocarbon passed through pipe 50 from circulating tank 12, and from which the chlorinated product is withdrawn in liquid form, together with some unchlorinated hydrocarbon, through pipe 20, and from which uncondensed vapors are passed to condenser 21 by pipe 20a. Hydrocarbons condensed in condenser 21 and which are to be returned to the chlorinating reaction pass through pipe 22 to circulating tank 12 and the vapors from condenser 21 pass through pipe 23 to the hydrochloric acid absorber 24 wherein the temperature is controlled by cooling water from pipe 24c. Water is introduced to the absorber 24 through pipe 24a and aqueous hydrochloric acid passes from the absorber 24 through pipe 25. Vapor from absorber 24 passes through pipe 26 to neutralizer 27 that is supplied with aqueous caustic soda by pipe 27b and drained by pipe 27c. Vapors pass from neutralizer 27 through pipe 1a to condenser 29 from which liquid passes to decanter 30 and there water is drained through pipe 31 while hydrocarbons pass through pipes 1b and 1 to acidulator 3. Fresh supplies of hydrocarbons to be chlorinated are led to acidulator 3 through pipes 2 and 1, and acidulated hydrocarbons pass from acidulator 3 through pipe 4 to any suitable settling device 5 wherein settling may be hastened by agglomerating means. A compressor 37 may be interposed in pipe 1a if desired.

The acidulating chamber 3 consists of any suitable container having within it any construction, such as raschig rings 3a, that will facilitate contact between the substance to be acidulated and the hydrogen chloride.

Hydrogen chloride is brought into the acidulator preferably at the bottom thereof by pipe 7 and any excess hydrogen chloride is withdrawn from the upper portion of the acidulator by pipe 8. Any source of hydrogen chloride may be used but in chlorination of the type described it is convenient to use the uncondensed cooled vapors from the chlorinating reaction, preferably after removal therefrom of chlorinated substances produced in the chlorinating reaction.

The supply of hydrogen chloride to the acidulator 3 may be drawn from the products passing to the hydrochloric acid absorber, as by pipe 7 leading from pipe 23 at a point on the high pressure side of pressure reducing valve 28 therein, and are returned to those products by pipe 8 leading to a point in pipe 23 on the low pressure side of valve 28.

If the acidulation is carried on when the substance to be dehydrated is in vapor phase, precipitation of the contained moisture will occur upon condensation of the substance.

Although the precipitated moisture will separate out by gravity, that separation is accelerated when the aqueous hydrochloric acid particles are agglomerated and such agglomeration may be effected by passing the hydrocarbon, containing the precipitated moisture, over coke breeze 5a, present in the agglomerator 5. The coke breeze is preferably supported on perforated partition 9 leaving a settling chamber 10 from the bottom of which acid is withdrawn and from an upper level of which the dehydrated hydrocarbon is withdrawn through pipe 11 to circulating tank 12.

While dehydration in accordance with my invention is particularly advantageous in chlorination in accordance with my invention, it is generaly applicable to dehydration of hydrocarbons immiscible with water as in the dehydration of oils used for immersion of electrical equipment.

While I have described numerous details for the purpose of assisting in the understanding of my invention, it is not limited thereto but includes such modifications and variations as fall within the hereunto appended claims. In this connection, it will be apparent from the foregoing that I have described a process and apparatus suitable to the practice thereof, whereby important advantages are attained in the chlorination of various substances, including chlorination of pentanes. Thus, in the practice of my invention introduction of moisture into the equipment is substantially minimized. And, substances that are contained in the products of chlorination and are returned to the chlorination step are prepared for such return by removing chlorinated substance, thereby preventing formation of undesired higher chlorides that would be formed by such return of chlorinated products and also thereby providing a dry vapor mixture containing hydrogen chloride and free of chlorinated substances and suitable for use in subsequent dehydration of substances passing to the chlorinating step. And, unchlorinated substance that is contained in the products of chlorination and is to be returned to the chlorinating reaction is withdrawn so far as practicably possible from the hydrogen chloride that is subsequently absorbed with water, thereby avoiding contamination of such substance by water in the hydrogen chloride removal. And, such unchlorinated substance as is not withdrawn from the hydrogen chloride and becomes moisture laden in the removal of hydrogen chloride, is dehydrated in preparation for its return to the chlorinating operation. And, fresh quantities of substance to be chlorinated are also dehydrated prior to introduction into the chlorinating step, the dehydrating agent being obtained as an intermediate product in that treatment of the products of chlorination which prevents return of chlorinated substance and keeps dry unchlorinated substance that is returned to the chlorinating operation.

Still referring to the chlorination of pentanes as an exemplary application of my invention, I have carried out the chlorination thereof as follows:

Vapor of pentanes formed at 85° C. to 100° C. and at about 75 pounds gauge pressure and chlorine vapor at 40° C. to 60° C. and at a pressure above 60 pounds, have been brought together in the proportion of 15 to 20 parts pentane to one part chlorine, at about 85° C. to 100° C. under a pressure of 35 to 50 pounds and caused to react by heating to a temperature between 275 C. and 325° C. Then the products of chlorination were cooled to about 80° C. to 85° C. under a pressure of 15 to 25 pounds and introduced into a rectifier from which a mixture of amyl chlorides and pentanes was withdrawn in liquid form while a reflux of pentanes at atmospheric temperature was maintained. The vapors leaving the rectifier were at the boiling point of pentane at the pressure used and were condensed under a pressure that would cause the pentanes to liquify at the temperature of cooling water available, for example, 10 pounds. Hydrogen chloride was absorbed by water under atmospheric pressure at a temperature in the neighborhood of 40° C. Condensation and dehydration of acid-freed pentane was conveniently carried out under about 10 pounds pressure, that pressure being maintained in the circulating tank.

What I claim and desire to secure by Letters Patent is:

1. In the chlorination of hydrocarbons the process comprising reacting a hydrocarbon with chlorine, withdrawing chlorinated hydrocarbon and unchlorinated hydrocarbon from the reaction products, contacting the remaining products with water to remove hydrogen chloride therefrom, contacting products passing from said water contact with products passing from the reaction, removing water precipitated by said last mentioned contacting step, and passing the dehydrated product to said reaction.

2. In the chlorination of hydrocarbons the process comprising reacting a hydrocarbon with chlorine, withdrawing chlorinated hydrocarbon from the reaction products, and contacting dry remaining products containing hydrogen chloride with fresh quantities of hydrocarbon passing to the reaction and thereby dehydrating the fresh hydrocarbon.

3. In the chlorination of hydrocarbons, the process comprising reacting a hydrocarbon with chlorine, withdrawing chlorinated hydrocarbon from the reaction products, contacting with water a portion of the reaction products containing hydrogen chloride and thereby removing hydrogen chloride therefrom, contacting products passing from said water contact and fresh hydrocarbon with another portion of said reaction products containing hydrogen chloride, removing from the mixed hydrocarbons water precipitated by said last mentioned contacting step, and passing the moisture-freed product to the chlorinating reaction.

4. In the chlorination of hydrocarbons, the process comprising passing a hydrocarbon and chlorine through a reaction zone and thereby reacting the hydrocarbon with the chlorine, withdrawing chlorinated hydrocarbon from the products which pass from the reaction zone, contacting with water the vapors which pass from the reaction zone and which contain hydrogen chloride and from which chlorinated hydrocarbon has been withdrawn and thereby removing hydrogen chloride from said vapors, contacting fresh hydrocarbon and products which pass in vapor phase from said water-contacting step and which contain unchlorinated hydrocarbon and moisture with vapors which pass from the reaction zone and from which chlorinated hydrocarbon has been withdrawn and which contain hydrogen chloride, removing from the mixed hydrocarbons the aqueous precipitate formed therein by said last-mentioned contacting step, and passing to the reaction zone the water-freed product.

5. In the chlorination of hydrocarbons, the process comprising passing a hydrocarbon and chlorine through a reaction zone and thereby reacting the hydrocarbon with the chlorine, contacting with water vapors which pass from said reaction zone and which contain hydrogen chloride and thereby removing hydrogen chloride from said vapors, contacting the vapors which pass from said water-contacting step and which contain unchlorinated hydrocarbon and moisture with a basic neutralizing agent and thereby neutralizing the acidity thereof, contacting the unchlorinated hydrocarbon passing from said neutralizing step with vapors which pass from the reaction zone and which contain hydrogen chloride, removing from the hydrocarbon passing from said last-mentioned contacting step the aqueous precipitate formed by said last-mentioned contacting step, and passing to the reaction zone the water-freed hydrocarbon.

6. In the chlorination of hydrocarbons, the process comprising passing a hydrocarbon and chlorine through a reaction zone and thereby reacting the hydrocarbon with the chlorine, contacting with water vapors which pass from said reaction zone and which contain hydrogen chloride and thereby removing hydrogen chloride from said vapors, contacting the products which pass from said water-contacting step and which contain unchlorinated hydrocarbon and moisture with vapors which pass from the reaction zone and contain hydrogen chloride, removing from the hydrocarbon passing from said last-mentioned contacting step the aqueous precipitate formed by said last-mentioned contacting step, and passing to the reaction zone the water-freed hydrocarbon.

7. In the chlorination of hydrocarbons, the process comprising passing through a reaction zone in vapor-phase a hydrocarban and chlorine and thereby reacting the hydrocarbon with the chlorine, by rectification withdrawing chlorinated hydrocarbon from the remaining products which pass in vapor-phase from the reaction zone, contacting with water the vapors which pass from the reaction zone and which contain hydrogen chloride and from which chlorinated hydrocarbon has been withdrawn and thereby removing hydrogen chloride from such vapors, contacting with a basic neutralizing agent the vapors passing from said water-contacting step and thereby neutralizing the acidity thereof, condensing from the vapors which pass from the water-contacting step unchlorinated hydrocarbon containing water, contacting the condensed unchlorinated hydrocarbon with vapors which pass from said reaction zone and which contain hydrogen chloride and from which chlorinated hydrocarbon has been withdrawn, passing residual vapors from said last-mentioned contacting step to said water-contacting step, removing from the condensed hydrocarbon the aqueous precipitate formed therein by said vapor-contacting step, and passing to the reaction zone in vapor phase the water-freed hydrocarbon.

8. In the chlorination of hydrocarbons, the process comprising passing through a reaction zone in vapor-phase a hydrocarbon and chlorine and thereby reacting the hydrocarbon with the chlorine, contacting with water vapors which pass from the reaction zone and which contain hydrogen chloride and thereby removing hydrogen chloride from such vapors, contacting with a basic neutralizing agent the vapors passing from said water-contacting step and thereby neutralizing the acidity thereof, condensing from the vapors which pass from the water-contacting step unchlorinated hydrocarbon containing water, contacting the condensed unchlorinated hydrocarbon with vapors which pass from said reaction zone and which contain hydrogen chloride, passing residual vapors from said last-mentioned contacting step to said water-contacting step, removing from the condensed hydrocarbon the aqueous precipitate formed therein by said vapor-contacting step, and passing to the reaction zone in vapor-phase the water-free hydrocarbon.

9. In the chlorination of hydrocarbons, the process comprising passing through a reaction zone in vapor-phase a hydrocarbon and chlorine and thereby reacting the hydrocarbon and chlorine and thereby reacting the hydrocarbon with the chlorine, contacting with water vapors which pass from the reaction zone and which contain hydrogen chloride and thereby removing hydrogen chloride from such vapors, condensing unchlorinated hydrocarbon containing moisture from the products passing from said water-contacting step, contacting the condensed unchlorinated hydrocarbon with vapors passing from said reaction zone and containing hydrogen chloride, passing residual vapors from said last-mentioned contacting step to said water-contacting step, removing from the condensed hydrocarbon aqueous precipitate formed therein by said contact thereof with said vapors, and passing to the reaction zone in vapor-phase the water-freed hydrocarbon.

10. In the chlorination of hydrocarbons, the process comprising passing a hydrocarbon and chlorine through a reaction zone and thereby reacting the hydrocarbon with the chlorine, condensing from the products which pass from the reaction zone a part of the unchlorinated hydrocarbon in said products, contacting with water vapors which pass from the reaction zone and which contain hydrogen chloride and residual unchlorinated hydrocarbon and thereby removing hydrogen chloride from said substances, contacting products which pass from said water-contacting step and which contain unchlorinated hydrocarbon and moisture with vapors which pass from the reaction zone and which contain hydrogen chloride, removing from the hydrocarbon passing from said last-mentioned contacting-step the aqueous precipitate formed therein by said last-mentioned contacting-step, and passing to the reaction zone the condensed hydrocarbon and the water-freed hydrocarbon.

In testimony whereof, I have signed my name to this specification.

EUGENE E. AYRES, Jr.

CERTIFICATE OF CORRECTION.

Patent No. 1,835,202.                        Granted December 8, 1931, to

EUGENE E. AYRES, JR.

It is hereby certified that error appears in the printed specification of the above numbered patent requiring correction as follows: Page 1, line 73, for the syllable "ture" read tude; page 3, line 35, for the misspelled word "generaly" read generally; page 4, line 91, claim 7, for the misspelled word "hydrocarban" read hydrocarbon; page 5, lines 18 and 19, claim 9, strike out the words "and chlorine and thereby reacting the hydrocarbon"; and that the said Letters Patent should be read with these corrections therein that the same may conform to the record of the case in the Patent Office.

Signed and sealed this 9th day of February, A. D. 1932.

(Seal)                                                                M. J. Moore,
                                                                    Acting Commissioner of Patents.